United States Patent
Schlaupitz et al.

(10) Patent No.: US 9,077,181 B2
(45) Date of Patent: Jul. 7, 2015

(54) BATTERY SECTION BALANCING METHODS AND SYSTEMS

(71) Applicant: GM GLOBAL TECHNOLOGY OPERATIONS LLC, Detroit, MI (US)

(72) Inventors: Christopher A. Schlaupitz, White Lake, MI (US); Andrew J. Namou, West Bloomfield, MI (US); John Reed, Ann Arbor, MI (US); Todd F. Mackintosh, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 385 days.

(21) Appl. No.: 13/739,969

(22) Filed: Jan. 11, 2013

(65) Prior Publication Data

US 2014/0197776 A1 Jul. 17, 2014

(51) Int. Cl.
*H02J 7/00* (2006.01)
*H02J 9/00* (2006.01)
(Continued)

(52) U.S. Cl.
CPC .............. *H02J 7/00* (2013.01); *H02J 7/0014* (2013.01); *B60L 11/123* (2013.01); *B60L 11/1857* (2013.01); *B60L 11/1866* (2013.01); *B60L 11/1887* (2013.01); *B60L 2200/10* (2013.01); *B60L 2200/32* (2013.01); *B60L 2240/545* (2013.01); *B60L 2240/547* (2013.01); *B60L 2240/549* (2013.01); *B60L 2250/16* (2013.01); *Y02T 10/7077* (2013.01); *Y02T 10/7005* (2013.01); *Y02T 10/7061* (2013.01); *Y02T 90/34* (2013.01); *Y02T 10/6217* (2013.01); *Y02T 10/7055* (2013.01)

(58) Field of Classification Search
CPC ......... H02J 7/00; H02J 7/0014; B06L 11/123; B06L 11/1857; B06L 11/1886; B06L 11/1887; B06L 2200/32; B06L 2240/545; B06L 2240/547; B06L 2240/549; B06L 2240/16; Y02T 10/7077; Y02T 10/7005; Y02T 10/7061; Y02T 10/6217; Y02T 10/7065; Y02T 90/34; H01M 2220/20
USPC ......... 320/103, 104, 110, 132, 133, 134, 148, 320/149; 307/150, 10.1
See application file for complete search history.

(56) References Cited

U.S. PATENT DOCUMENTS 6,331,762 B1 * 12/2001 Bertness ................... 320/134
6,420,851 B1 * 7/2002 Schoofs et al. ............ 320/132
(Continued)

FOREIGN PATENT DOCUMENTS

EP 1933159 A2 * 6/2008 ............. G01R 31/36

OTHER PUBLICATIONS

Li et al., Chinese Patent Document No. CN 102749588 A, Published Oct. 2012, 3 pages (front page and 1 drawing only).*

*Primary Examiner* — Phallaka Kik
(74) *Attorney, Agent, or Firm* — Phillips Ryther & Winchester; Matthew D. Thayne

(57) ABSTRACT

Methods and systems for balancing battery states of charge in a multi-sectioned battery. In some embodiments, states of health and states of charge of one or more sections of a multi-sectioned battery may be determined. A relationship between the states of charge and states of health of the battery sections may be determined. This information may be used apply a balancing algorithm to redistribute energy between the various battery sections in order to reduce a spread between the states of charge due to the varying states of health.

20 Claims, 7 Drawing Sheets

(51) Int. Cl.
  *B60L 1/00* (2006.01)
  *B60L 3/00* (2006.01)
  *B60L 11/12* (2006.01)
  *B60L 11/18* (2006.01)

(56) References Cited

U.S. PATENT DOCUMENTS

| | | | |
|---|---|---|---|
| 7,688,074 B2* | 3/2010 | Cox et al. | 324/426 |
| 8,046,181 B2* | 10/2011 | Kang et al. | 702/63 |
| 2003/0038637 A1* | 2/2003 | Bertness et al. | 324/426 |
| 2004/0024546 A1* | 2/2004 | Richter | 702/63 |
| 2004/0162683 A1* | 8/2004 | Verbrugge et al. | 702/64 |
| 2004/0232884 A1* | 11/2004 | Vaillancourt et al. | 320/132 |
| 2006/0181245 A1* | 8/2006 | Mizuno et al. | 320/132 |
| 2007/0069734 A1* | 3/2007 | Bertness | 324/411 |
| 2008/0030169 A1* | 2/2008 | Kamishima et al. | 320/134 |
| 2009/0001927 A1* | 1/2009 | Stamos et al. | 320/106 |
| 2009/0027056 A1* | 1/2009 | Huang et al. | 324/439 |
| 2009/0088994 A1* | 4/2009 | Machiyama et al. | 702/63 |
| 2011/0285356 A1* | 11/2011 | Maluf et al. | 320/139 |
| 2011/0316548 A1* | 12/2011 | Ghantous et al. | 324/427 |
| 2012/0200266 A1* | 8/2012 | Berkowitz et al. | 320/139 |
| 2012/0223670 A1* | 9/2012 | Kinjo et al. | 320/103 |
| 2012/0256569 A1* | 10/2012 | Kawahara et al. | 318/139 |
| 2012/0265397 A1* | 10/2012 | Aliberti et al. | 701/34.4 |
| 2012/0296586 A1* | 11/2012 | Kirchev | 702/63 |
| 2012/0313585 A1* | 12/2012 | Pereira | 320/128 |
| 2013/0004805 A1* | 1/2013 | Robertson et al. | 429/50 |
| 2013/0038289 A1* | 2/2013 | Tse | 320/118 |
| 2013/0069660 A1* | 3/2013 | Bernard et al. | 324/430 |
| 2013/0110430 A1* | 5/2013 | Nishi et al. | 702/63 |
| 2013/0271065 A1* | 10/2013 | Chou et al. | 320/107 |
| 2013/0307334 A1* | 11/2013 | Middleton et al. | 307/31 |
| 2013/0317771 A1* | 11/2013 | Laskowsky et al. | 702/63 |
| 2013/0320989 A1* | 12/2013 | Inoue et al. | 324/427 |
| 2015/0002105 A1* | 1/2015 | Kelly | 320/162 |

* cited by examiner

BATTERY SECTION BALANCING METHODS AND SYSTEMS

TECHNICAL FIELD

This disclosure relates to methods and systems for balancing one or more parameters in battery sections of a battery. For example, in some embodiments, this disclosure relates to methods and systems for balancing battery states of charge among battery sections having differing battery states of health.

BACKGROUND

Passenger vehicles often include electric batteries for operating features of a vehicle's electrical and drivetrain systems. For example, vehicles commonly include a 12V lead-acid automotive battery configured to supply electric energy to vehicle starter systems (e.g., a starter motor), lighting systems, and/or ignition systems. In electric, fuel cell ("FC"), and/or hybrid vehicles, a high voltage ("HV") battery system may be used to power electric drivetrain components of the vehicle (e.g., electric drive motors and the like).

In certain designs, battery systems included in a vehicle may include one or more sections. For example, a vehicle battery system may include a battery pack that comprises one or more sections of battery cells, such as many current battery systems for electric vehicles, including rechargeable energy storage systems (RESS) for extended-range electric vehicles (EREV). Battery sections may be replaced and/or added in a battery pack, resulting in differences in capacities, state of charge, discharge rates, impedances, and/or voltages between the new battery sections and the existing battery sections. Battery discharge may terminate when a section having the lowest capacity is depleted, regardless of whether other battery sections have sufficient capacity for sustained discharge. This behavior may result in battery system inefficiencies, degradation, and/or permanent damage.

Typically used sections are not replaced without a section balancing strategy. Such strategies are particularly important for dealing with energy storage chemistries that must maintain certain voltage limits for safety reasons, such as Lithium Ion batteries. Current cell balancing methods coupled with section replacements can cause unnecessary taxation on a rechargeable electricity storage system. Existing section balancing methods, however, tend to allow for too much spread between sections due to varying section states of health. Moreover, many such methods are not operational to minimize state of charge spread throughout the charge/discharge cycle of the system. Instead, existing section balance methodologies tend to balance based on the state of charge spread at key-on.

The present inventors have therefore determined that it would be desirable to provide methods and systems for balancing battery sections that overcome one or more of the foregoing limitations and/or other limitations of prior art.

SUMMARY

Methods and systems are disclosed herein for balancing states of charges of various sections of a multi-sectioned battery based upon their respective states of health. In some embodiments, an adaptable algorithm may be provided to maintain various sections having differing states of health for battery refurbishment while providing the least amount of state of charge variation. Some such methods may be configured to minimize state of charge spread throughout a charge/discharge cycle of the battery. For example, in some embodiments, an algorithm may use battery section state of health and state of charge information to determine an optimal state of charge variation curve. Some embodiments may employ section balance timers to achieve an optimal state of charge variation curve at any given point in time during the cycle. This same algorithm may be used to allow newer modules having differing capacities and/or resistances to be paired and utilized with older modules.

Using existing inputs and balancing hardware, the balancing algorithm may be used to predict a desired state of charge based on a starting state of charge that may be any point on a state of charge curve. Some embodiments may attempt to achieve state of charge balance among the sections at the point where the respective states of charge of the sections are each at a midpoint between an upper end of the state of charge cycle and a lower end of the state of charge cycle. For example, in some embodiments, the algorithm may be configured such that each of the section states of charge are balanced (i.e, each section is at least approximately at the same state of charge) at approximately 50% state of charge. By balancing the states of charge at such a midpoint, the state of charge spread amongst the battery sections may be minimized throughout the cycle, and, in particular, may be minimized at the most used state of charge operating points (particularly in comparison to algorithms that balance based on state of charge spread at key-on).

In one implementation of a method for balancing battery states of charge in a multi-sectioned battery, the method may comprise determining a state of health of a first section of a multi-sectioned battery, and determining a state of health of a second section of a multi-sectioned battery. The method may further comprise determining a relationship between a difference between the state of health of the first section and the state of health of the second section and a difference between a state of charge of the first section and a state of charge of the second section after a first time period.

A current state of charge of the first section and a current state of charge of the second section may be used, along with the relationship between a difference between the state of health of the first section and the state of health of the second section and a difference between a state of charge of the first section and a state of charge of the second section, to redistribute energy between the first section and the second section in order to reduce a spread between a state of charge of the first section and a state of charge of the second section during use of the multi-sectioned battery.

In some embodiments of systems for balancing battery states of charge in a multi-sectioned battery of the vehicle, the system may comprise a vehicle battery system comprising a plurality of battery sections and a battery balancing system coupled to the plurality of battery sections and configured to redistribute energy between the plurality of battery sections. The balancing system may be configured to assess states of health of at least a subset of the plurality of battery sections and current states of charge of at least a subset of the plurality of battery sections.

The balancing system may be further configured to use the states of health and the current states of charge to apply a balancing algorithm. The balancing algorithm may be configured to establish an equilibrium point at which the states of charge of the at least a subset of the plurality of battery sections are at least approximately equal and to balance the states of charge of the at least a subset of the plurality of battery sections around the equilibrium point such that the states of charge of the at least a subset of the plurality of battery sections vary during vehicle operation around the equilibrium point according to their respective states of health.

The equilibrium point may be at a relative midpoint between an upper end of a charge cycle of the battery sections and a lower end of the charge cycle. For example, in some embodiments, the equilibrium point may be at a state of charge of between about 40% and about 60%. In some such embodiments, the equilibrium point may be at a state of charge of about 50%.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with various embodiments of the present disclosure is provided below. While several embodiments are described, it should be understood that disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and apparatus disclosed herein may be used to balance the states of charge of various sections of a multi-sectioned battery system according to their respective states of health. Some embodiments disclosed herein may be particularly useful for rechargeable energy storage systems (RESS) within an extended-range electric vehicle (EREV). More specific embodiments and implementations will now be described in greater detail with reference to the accompanying drawings.

Figure 1:
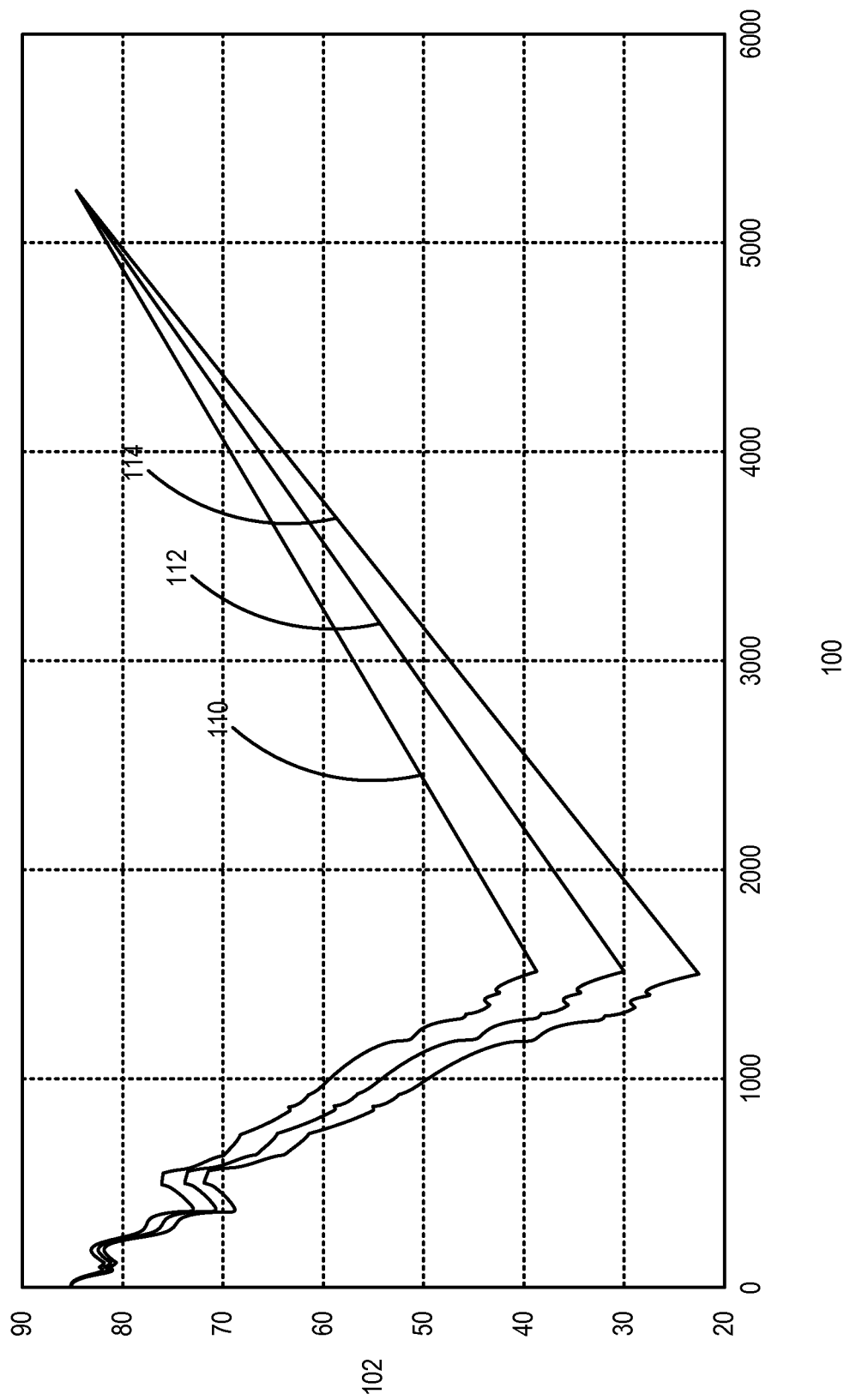
FIG. 1 illustrates a graph of a state of charge spread between three battery sections having differing states of health.

FIG. 1 is a graph depicting three full cycles with sections having varying states of health. Time in seconds is depicted along the "X" axis at 100 and the percentage state of charge is depicted along the "Y" axis at 102. As shown in the graph, each of the battery sections has an initial state of charge of 85% in the cycle. Curve 110 depicts a battery section having a state of health of 95%. Curve 112 depicts a battery section having a state of health of 80%. And curve 114 depicts a battery section having a state of health of 70%. As can be seen from the graph, the state of charge spreads naturally over the cycle even if equalized at a particular state of charge. As can also be seen, the state of charge spread appears to be linked to the states of health of the battery sections. In other words, the sections having lower states of charge tend to discharge faster.

Figure 2:
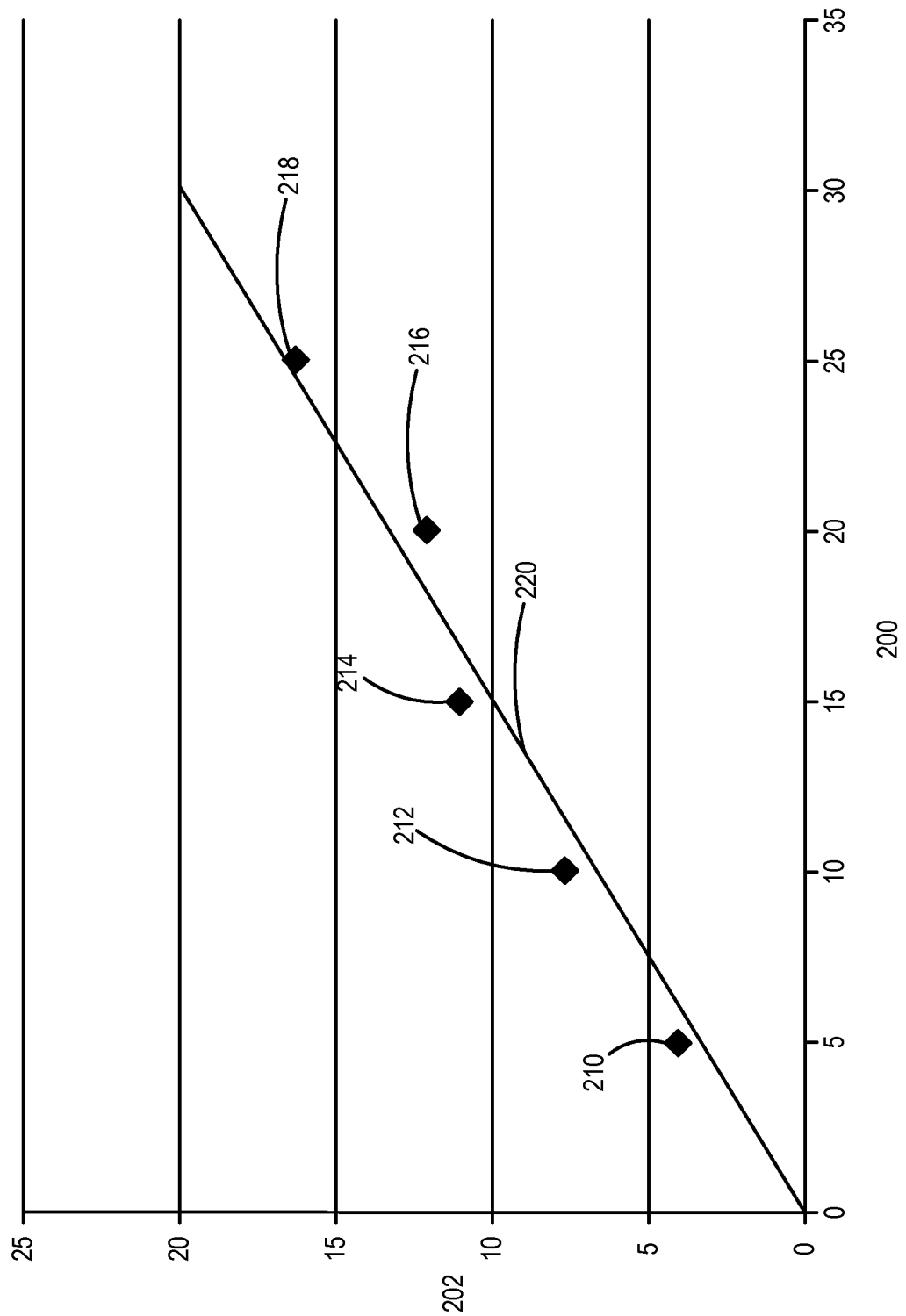
FIG. 2 illustrates a graph of a relationship between states of health and states of charge of the three battery sections referenced in FIG. 1.

If we plot the relationship between the state of health spread and the state of charge spread over time for the three battery sections referenced in the graph of FIG. 1, we find that the state of charge spread after discharge is roughly equivalent to ⅔ of the state of health spread. This relationship is depicted in the graph of FIG. 2. The graph of FIG. 2 depicts a change in the state of health along the "X" axis at 200 and depicts a change in the state of charge along the "Y" axis at 202 for the three battery sections referenced in FIG. 1.

Data points are plotted in the graph of FIG. 2 at 210, 212, 214, 216, and 218. Linear regression techniques can be applied to form a straight line 220 from these data points. For these particular data points, we find that the slope of the line is about ⅔ and the correlation coefficient squared ("$R^2$") is about 0.951, which means the data strongly exhibits a linear relationship.

Using this data regarding the relationship between section states of charge and states of health during a charge cycle, a balancing algorithm can be created that can run at any state of charge. In addition, such an algorithm may be created using an equilibrium point so as to minimize the state of charge spread at any point during the cycle. In some embodiments, the equilibrium point may be selected at a relative midpoint between an upper state of charge during a charge cycle (such as 90%, as shown in FIG. 1) and a lower state of charge during a charge cycle (such as 20%, as also shown in FIG. 1). This equilibrium point may, in some embodiments, therefore be selected so as to be between about 40% and about 60%. In some such embodiments, the equilibrium point may be selected so as to be at a state of charge of about 50%. By selecting the equilibrium point in this manner, the state of charge spread throughout the charge cycle may be cut in half compared to balancing at the upper state of charge. As such, the state of charge spread has been reduced from about ⅔ of the state of health spread to about ⅓ of the state of health spread.

Figure 3:
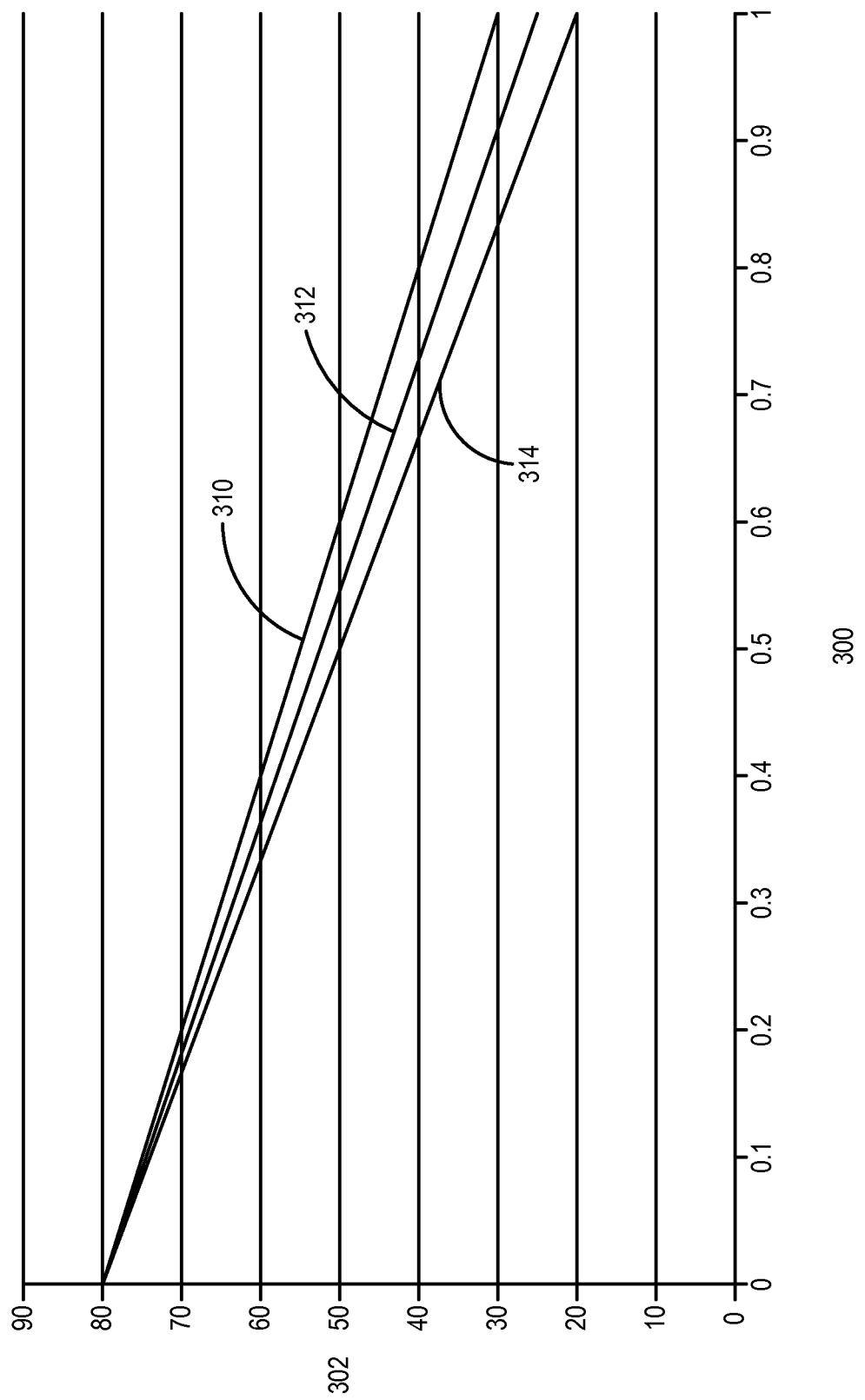
FIG. 3 illustrates a graph of a state of charge spread of three battery sections having differing states of health using an equilibrium point of 80%.
Figure 4:
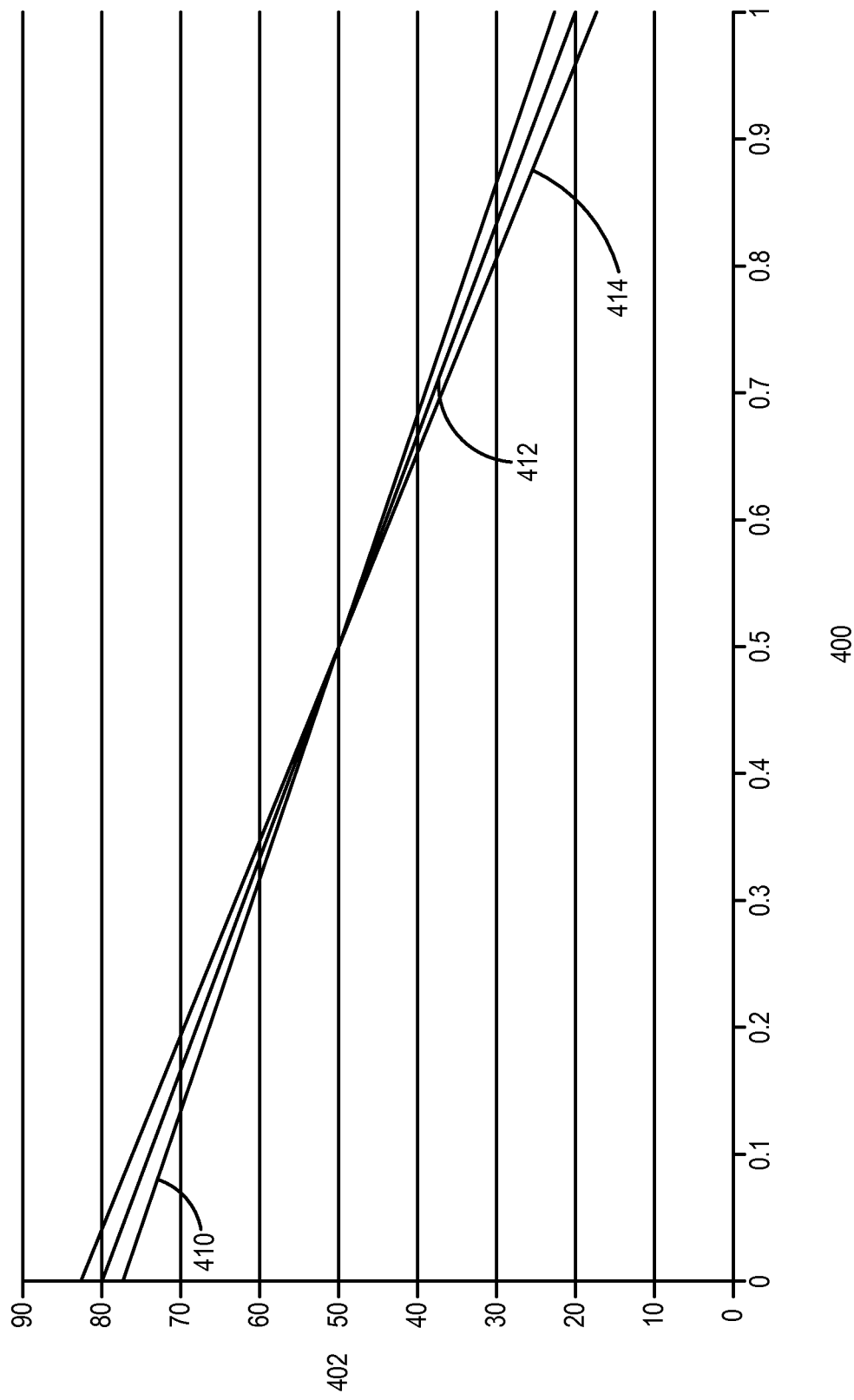
FIG. 4 illustrates a graph of a state of charge spread of three battery sections having differing states of health using an equilibrium point of 50%.

This reduction in the state of charge spread by selecting a midpoint equilibrium point is further illustrated by comparing FIGS. 3 and 4. FIG. 3 depicts a graph showing states of charge over a charge cycle for three battery sections having differing states of health with an equilibrium point at an upper end (80%) of the charge cycle. FIG. 4 depicts a graph showing states of charge over a charge cycle for the same three battery sections, but with an equilibrium point at a midpoint (50%) of the charge cycle. The amount of discharge is depicted along the "X" axis in FIG. 3 at 300 and in FIG. 4 at 400 and the state of charge is depicted along the "Y" axis in FIG. 3 at 302 and in FIG. 4 at 402.

Line 310 in FIG. 3 depicts a charge cycle for a battery section having a relatively high state of health. Line 312 depicts a charge cycle for a battery section having a middle state of health. And line 314 depicts a charge cycle for a battery section having a relatively low state of health. Similarly, line 410 in FIG. 4 corresponds to the high state of health battery section, line 412 the middle state of health battery section, and line 414 the low state of health section. As can be seen from comparing FIG. 3 with FIG. 4, setting the equilibrium point at or near the midpoint of the charge cycle results in a substantial reduction of the state of charge spread throughout the cycle.

By placing the equilibrium point at or near the midpoint of the cycle, the state of charge spread between the battery sections at an upper state of charge may be at least approximately equal and opposite to the state of charge spread at a lower state of charge. In addition, as illustrated in FIG. 4, the state of charge spread may be approximately zero at or around the midpoint (selected to be the equilibrium point) between the upper and lower states of charge.

In some embodiments, a multiplier may be incorporated into the balancing algorithm to take this into account. For example, a delta state of charge multiplier may be calculated as: (current state of charge−equilibrium point)/(delta state of charge from equilibrium point to upper and/or lower state of charge). Thus, with regard to the embodiment depicted in the minimized state of charge spread graph of FIG. 4, the delta state of charge multiplier would be (current state of charge−50)/30. The graph below charts the delta state of charge multiplier for various current states of charge during a charge cycle for this particular embodiment:

| SOC | Delta SOC Multiplier |
|---|---|
| 80 | 1 |
| 65 | 0.5 |
| 50 | 0 |
| 35 | −0.5 |
| 20 | −1 |

In embodiments employing such a multiplier, the balancing algorithm may be initialized at any state of charge rather than being limited to running only at particular charge conditions, such as at an upper state of charge condition. This also allows balancing to occur irrespective of the driver type. Moreover, some such embodiments may be used to combine power systems of differing types and/or generations. For example, some embodiments may be used in connection with future power systems (not just energy systems).

In embodiments employing a multiplier, this figure can be combined with a determined state of charge spread, which may be either measured or estimated, into an equation for Delta state of charge. For example, in some embodiments, the balancing algorithm may calculate the Delta state of charge for a particular battery section relative to another battery section as follows:

$$\text{Delta SOC} = (\text{Delta SOC Multiplier}) * (\text{SOC spread relative to SOH spread}) * (\text{Delta SOH})$$

For the particular embodiment discussed above, this equation becomes:

$$\text{Delta SOC} = (\text{SOC} - 50)/30 * (\tfrac{1}{3}) * (\text{Delta SOH})$$

A timer strategy or another energy redistribution system may then be implemented to determine appropriate timer states for each section in order to redistribute energy between the various battery sections in order to minimize state of charge variation between the battery sections throughout the charge cycle. In some embodiments, the timer strategy may comprise a bleed-off timer strategy. In some embodiments, the energy redistribution system may be applied at key-on. Thus, in embodiments employing a timer strategy, the timer states for each battery section may be determined and applied at key-on. In some embodiments, this may take place irrespective of the state of charge of the battery system at key-on.

An example of a timer algorithm according to these principles may be applied as follows. A "middle" state of charge (MidSOC) may be calculated as a maximum state of charge plus a minimum state of charge, divided by two. Similarly, a "middle" state of health (MidSOH) may be calculated as a maximum sate of health plus a minimum state of health, divided by two. Then, a timer state for battery section "x" ($\text{Timer}_x$) having a current state of charge ($\text{SOC}_x$) and a current state of health ($\text{SOH}_x$) may be applied with the following algorithm:

If $(\text{SOC}_x - \text{MidSOC}) > ((\text{MidSOC}-50)/30) * (\tfrac{1}{3}) * (\text{MidSOH} - \text{SOH}_x)$, then $\text{Timer}_x = (\text{SOC}_x - \text{MidSOC} - ((\text{MidSOC}-50)/30) * (\tfrac{1}{3}) * (\text{SOH}_x - \text{MidSOH})) * 7200 * \text{SOH}_x$; else $\text{Timer}_x = 0$.

This algorithm, or a similar algorithm employing the principles set forth herein, may be applied to each of the battery sections in order to provide for an improved balancing strategy that better reduces state of charge spread among the various battery sections.

Figure 5:
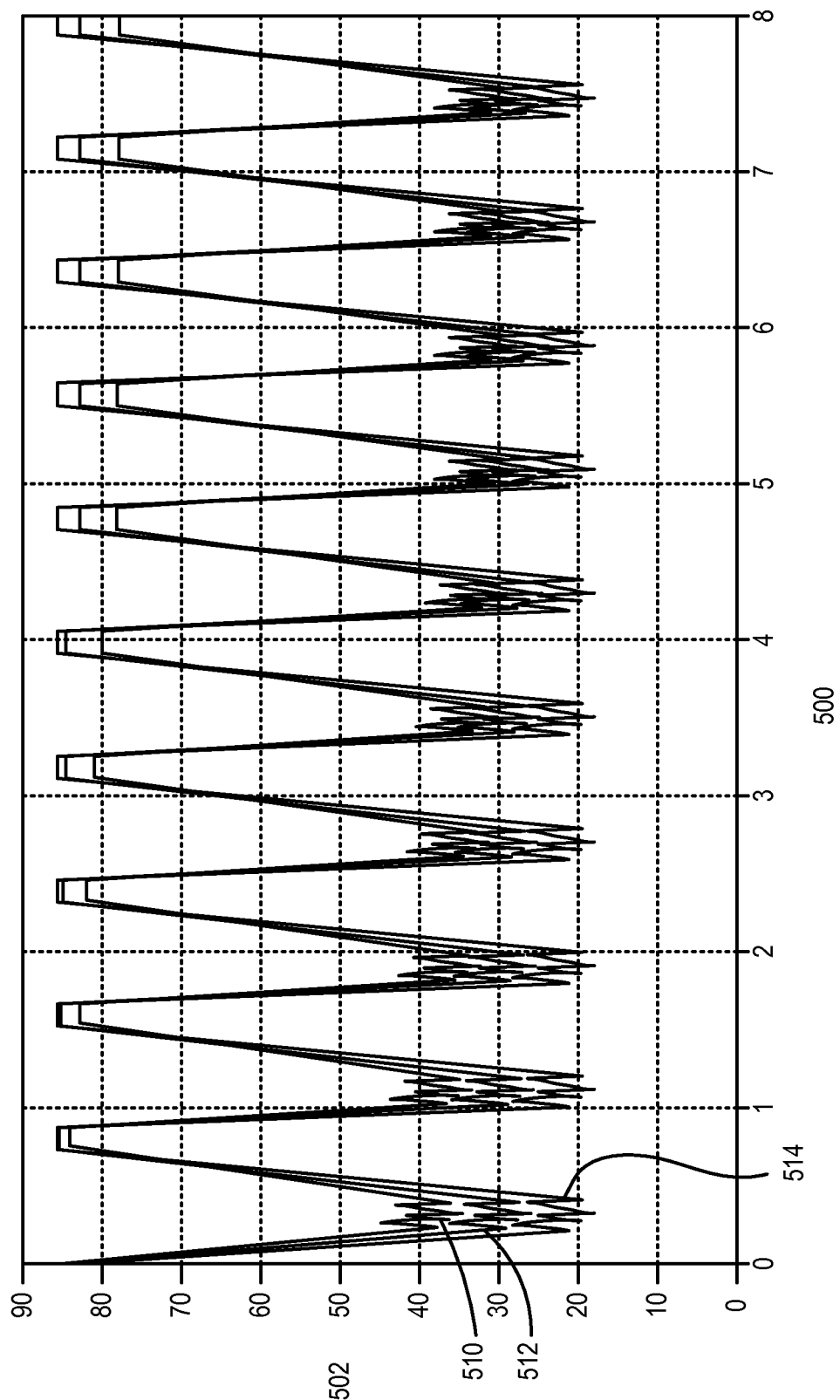
FIG. 5 illustrates a graph of the states of charge of three battery sections having differing states of health during an operating cycle employing a balancing algorithm according to one embodiment disclosed herein.

An example of an operating cycle using the above-identified timer algorithm is shown in the graph of FIG. 5. Time in seconds (times $10^4$) is shown along the "X" axis at 500. State of charge (as a percentage) is shown along the "Y" axis at 502. The operating cycle of a battery section having a relatively high state of health (i.e., 95%) is shown at 510. Line 512 depicts an operating cycle for a battery section having a middle state of health (i.e., 80%). And line 514 depicts an operating cycle for a battery section having a relatively low state of health (i.e., 70%). Each of the three battery sections is shown as initializing within the cycle at a state of charge of 85%.

As shown in FIG. 5, the state of charge spread is minimized over the entire cycle. The state of charge spread of the three battery sections equalizes once the spread at high state of charge is equal to the spread at low state of charge. The logic may be configured, however, to allow balancing to occur no matter what the state of charge of the pack at key-on.

Figure 6:
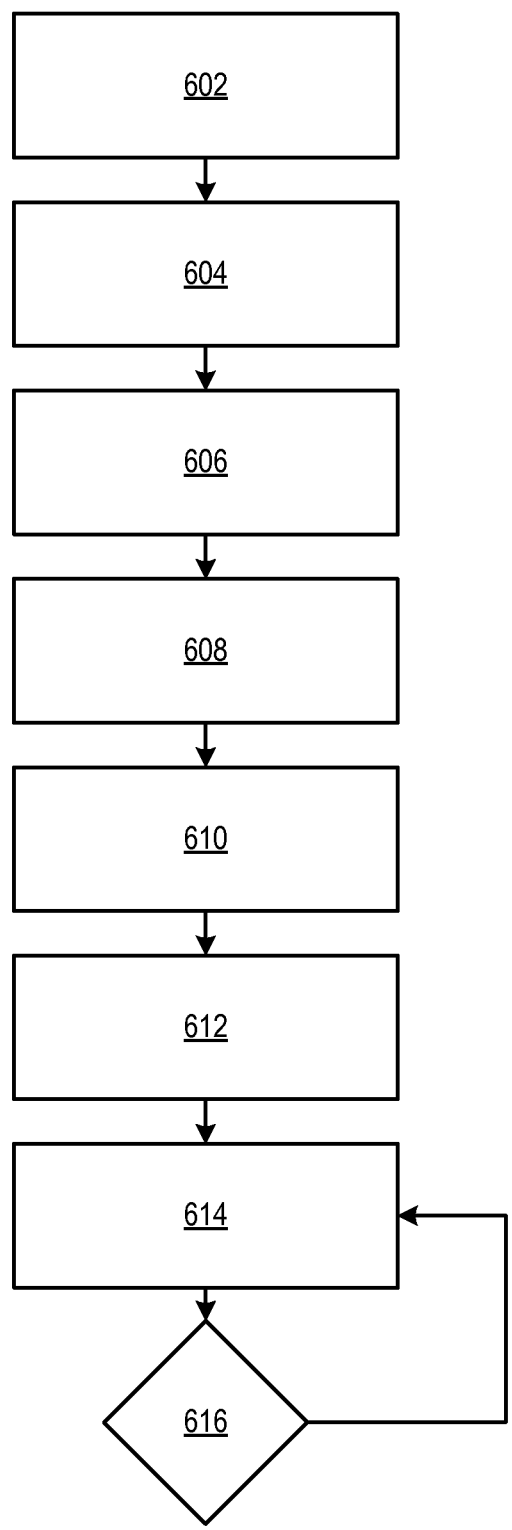
FIG. 6 illustrates a flow chart of one implementation of a method for balancing battery states of charge in a multi-sectioned vehicle battery.

FIG. 6 illustrates an example of a method for balancing battery states of charge among battery sections having differing battery states of health. At step 602, a vehicle comprising a multi-sectioned battery system is turned on. At step 604, a state of health/state of charge relationship is determined. In some implementations, step 604 may comprise determining a relationship between a difference between the state of health of one or more of the battery sections and the state of health of one or more of the battery sections and a difference between a state of charge of the one or more battery sections and a state of charge of the one or more sections after a time period. This may be accomplished, for example, by calculating a slope of a line created using a linear regression technique, as described above with reference to FIG. 2.

At step 606, an equilibrium point may be established. In some implementations, this may be accomplished by calculating the mid-point between an upper end or upper limit of a state of charge operating cycle and a lower end or lower limit of the state of charge operating cycle for the battery sections in the battery system. In some implementations, the equilibrium point may be at a state of charge between about 40% and about 60%. In some such implementations, the equilibrium point may be at a state of charge of about 50%.

At step 608, a delta state of charge multiplier may be calculated for the state of charges within a particular operational range. For example, in some implementations, as described above, the delta state of charge multiplier may be calculated as (current state of charge−equilibrium point)/(delta state of charge from equilibrium point to upper and/or lower state of charge). Thus, with regard to the embodiment depicted in the state of charge spread graph of FIG. 4, the delta state of charge multiplier would be (current state of charge−50)/30. In some implementations, the delta state of charge multiplier may be used in the algorithm as follows:

$$\text{Delta SOC Multiplier} = ((\text{SOC at key-on}) - (\text{SOC Upper Limit} - \text{SOC Lower Limit})/2)/(\text{SOC Upper Limit} - (\text{SOC Upper Limit} - \text{SOC Lower Limit})/2)$$

At step 610, the delta state of charge multiplier may be applied to the current states of charge for each battery section according to the established equilibrium point. Then section-based timer(s) may be calculated at step 612 for each battery section according to one or more parameters, including battery section states of health, current states of charge, targeted equilibrium points, and the like. In some implementations, the section-based timers may comprise bleed off timers, and may be used to set a timer state for battery section "x" ($\text{Timer}_x$) having a current state of charge ($\text{SOC}_x$) and a current state of health ($\text{SOH}_x$) with the following algorithm:

$$\text{If } (\text{SOC}_x - \text{MidSOC}) > ((\text{MidSOC} - 50)/30)*(1/3)*(\text{MidSOH} - \text{SOH}_x), \text{ then Timer} = (\text{SOC}_x - \text{MidSOC} - ((\text{MidSOC} - 50)/30)*(1/3)*(\text{SOH}_x - \text{MidSOH}))*7200*\text{SOH}_x; \text{ else Timer}_x = 0.$$

At step 614, the section-based timer(s) may be applied to the battery sections of the multi-sectioned battery system in order to reduce state of charge spread. At step 616, a check is done to ensure that timers are complete for all sections. If not, the example method of FIG. 6 returns to step 614 to further apply section-based timers as needed.

Figure 7:
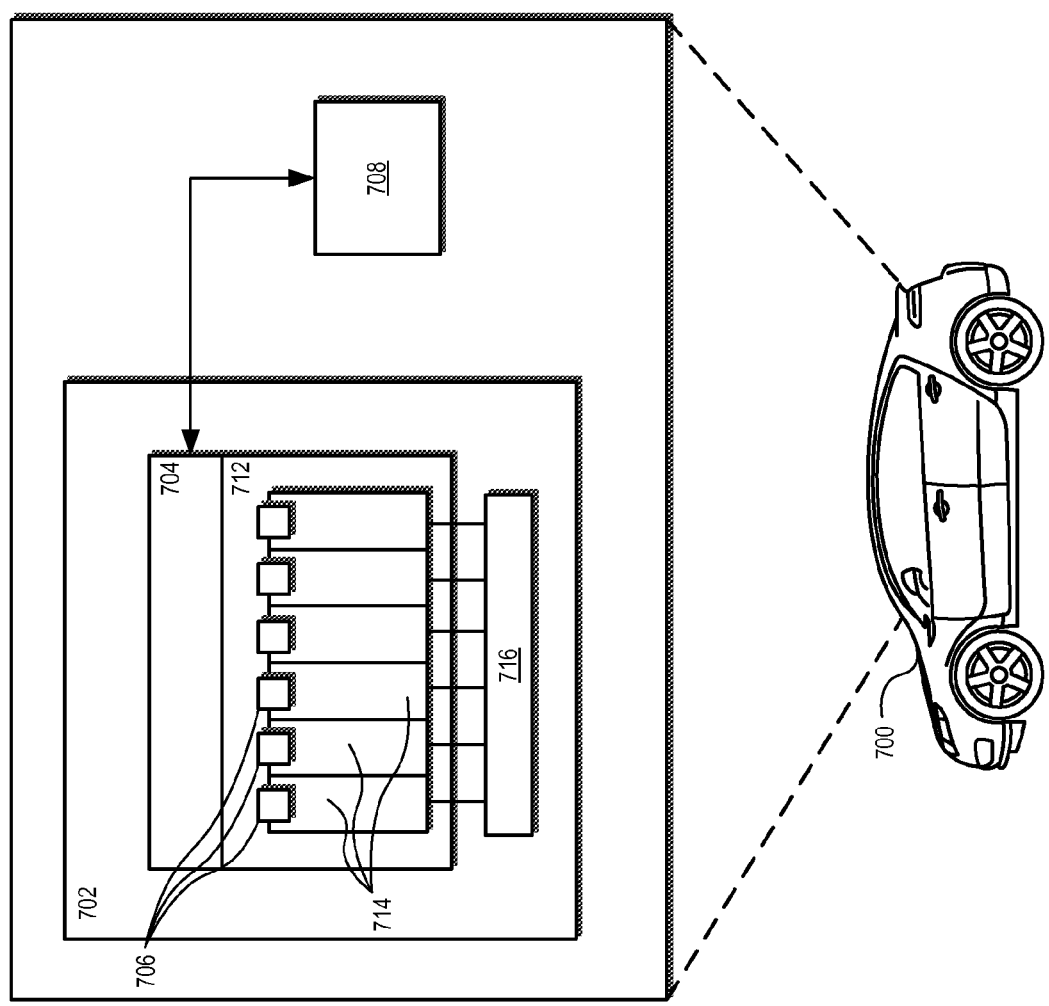
FIG. 7 illustrates an example of a system for balancing battery states of charge in a multi-sectioned vehicle battery.

FIG. 7 illustrates an example of a system for balancing a battery system in a vehicle 700 consistent with embodiments disclosed herein. The vehicle 700 may be a motor vehicle, a marine vehicle, an aircraft, and/or any other type of vehicle, and may include an internal combustion engine ("ICE") drivetrain, an electric motor drivetrain, a hybrid engine drivetrain, a FC drivetrain, and/or any other type of drivetrain suitable for incorporating the systems and methods disclosed herein. The vehicle 700 may include a battery system 702 that, in certain embodiments, may be a HV battery system. The battery system may be used to power electric drivetrain components (e.g., as in an electric, hybrid, or FC power system). In some embodiments, the battery system 702 may be configured to supply electric energy to a variety of vehicle 700 systems, including, for example, vehicle starter systems (e.g., a starter motor), lighting systems, ignition systems, and/or the like.

The battery system 702 may comprise battery electronics 704. The battery electronics 704 may be configured to monitor and control certain operations of the battery system 702. For example, the battery electronics 704 may be configured to monitor and control charging, discharging, and/or balancing operations of the battery system 702. In certain embodiments, the battery electronics 704 may be communicatively coupled with one or more sensors (e.g., sensors 706), actuation devices (e.g., electrical relays), and/or systems configured to enable the battery electronics 704 to monitor and control operations of the battery system 702.

The battery electronics 704 may further be configured to provide information to and/or receive information from other systems included in the vehicle 700. For example, the battery electronics 704 may be communicatively coupled with an internal vehicle computer system 708. In certain embodiments, the battery electronics 704 may be configured, at least in part, to provide information regarding the battery system 702 to a user of the vehicle 700 and/or vehicle computer system 708. Such information may include, for example, battery state of charge information, battery operating time information or other battery health information, battery operating temperature information, and/or any other information regarding the battery system 702.

The battery system 702 may include one or more battery packs 712 suitably sized and configured to provide electrical power to the vehicle 700. Each battery pack 712 may include one or more battery sections 714. The battery sections 714 may comprise one or more battery cells utilizing any suitable battery technology including, for example, lead-acid, nickel-metal hydride ("NiMH"), lithium-ion ("Li-Ion"), Li-Ion polymer, lithium-air, nickel-cadmium ("NiCad"), valve-regulated lead-acid ("VRLA") including absorbed glass mat ("AGM"), nickel-zinc ("NiZn"), molten salt (e.g., a ZEBRA battery), and/or other suitable battery technologies. As discussed above, each of the various battery sections may have differing states of health.

To balance an individual section 714 of battery pack 712, one or more battery cells included the section 714 may be balanced. To balance multiple sections 714 of the battery pack 712 together, the battery cells included in the multiple sections may all be balanced as a group. Accordingly, as used herein, balancing a state of charge of a section or sections 714 may comprise balancing one or more constituent battery cells of the section or sections 714.

Each battery section 714 may be communicatively coupled to a balancing system 716. Balancing system 716 may be configured to selectively transfer energy to or from battery sections 714, such as by transferring energy to or from individual cells included in battery sections 714. For example, balancing system 716 may include a network of switches and/or gates configured to facilitate selective energy transfer between battery sections 714. In certain embodiments, each section 714 may be associated with a discrete balancing system 716 configured to facilitate selective energy transfer between its constituent cells. In further embodiments, multiple sections 714 may be associated with a single balancing system 716. Thus, in some embodiments, a single balancing system 716 may coordinate balancing the states of charge of all of the battery sections 714 of a battery system. Certain functionality of the balancing system 716 may be controlled by battery electronics 704 and/or vehicle computer system 708.

Balancing system 716 may also be configured to employ one or more balancing algorithms, such as the algorithms discussed above, in order to balance states of charge of the battery sections according to their respective states of health. The balancing system 716 may therefore be configured to use the states of health and the current states of charge of at least some of the battery sections 714 of the battery pack 712 to apply a balancing algorithm. In some embodiments, the balancing algorithm may be configured to establish an equilibrium point at which the states of charge of the at least a subset of the plurality of battery sections 714 are at least approximately equal. The balancing algorithm may also be configured to balance the states of charge of at least a subset of the battery sections 714 around the equilibrium point such that the states of charge of the battery sections vary during vehicle operation around the equilibrium point according to their respective states of health.

The balancing system 716 may also be configured to determine a relationship between a difference between states of health of the battery sections 714 and a difference between states of charge of the at least a subset of the plurality of battery sections during operation of the vehicle 700. In some embodiments, determining a relationship between a difference between states of health of the battery sections 714 and a difference between states of charge of the battery sections 714 during operation of the vehicle 700 may comprise estimating such a relationship. As previously described, this relationship may be estimated in some embodiments by plotting data points relating states of health to a change of states of charge.

In some embodiments, the balancing algorithm may be configured to balance the states of charge of the battery sections 714 around the equilibrium point such that a spread between the states of charge of the battery sections 714 increases as the respective states of charge of the battery sections 714 increase above the equilibrium point.

The battery balancing system 716 may, in some embodiments, comprise a plurality of sensors for obtaining data used to at least one of determine states of charge for the battery sections 714 and determine states of health for the battery sections 714. Such sensors (sensors 706, for example) may be configured to determine, such as calculate or estimate, a state of charge of an associated battery section 714 using, for example, voltage measurements.

Although FIG. 7 illustrates separate sensors 706 associated with each battery section 714, in some embodiments a single sensor configured to estimate a state of charge of a plurality of sections 714 may alternatively be utilized. State of charge information sensed, calculated, or estimated (any of which should be considered to be within the scope of the term "determined") by sensors 706 (e.g., using measured voltages, impedances, and/or any other suitable information) may be provided to battery electronics 704. Using the state of charge information and state of health information, battery electronics 704 and/or any other suitable system may coordinate battery balancing operations, such as by initiating a balancing algorithm that may, as discussed above, coordinate application of bleed-off timer strategies.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A method for balancing battery states of charge in a multi-sectioned battery, the method comprising the steps of:
   determining a state of health of a first section of a multi-sectioned battery;
   determining a state of health of a second section of a multi-sectioned battery;
   determining a relationship between a difference between the state of health of the first section and the state of health of the second section and a difference between a state of charge of the first section and a state of charge of the second section after a first time period;
   receiving a current state of charge of the first section;
   receiving a current state of charge of the second section; and
   using the relationship and the current states of charges of the first and second sections to redistribute energy between the first section and the second section in order to reduce a spread between a state of charge of the first section and a state of charge of the second section during use of the multi-sectioned battery.

2. The method of claim 1, wherein the step of determining a state of health of the first section of the multi-sectioned battery comprises:
   receiving a state of charge of the first section at a first time;
   receiving a state of charge of the first section at a second time; and
   comparing a reduction in the state of charge of the first section between the first time and the second time with a baseline reduction figure.

3. The method of claim 2, wherein the baseline reduction figure comprises an estimated reduction in state of charge associated with a section having a maximum state of health.

4. The method of claim 1, wherein the step of determining a state of health of the first section of the multi-sectioned battery comprises measuring at least one of an impedance, capacity, charge acceptance, discharge capability, usage time, and age associated with the first section.

5. The method of claim 1, wherein the step of determining a state of health of the first section of the multi-sectioned battery comprises assigning a weighted figure to the state of health of the first section, and wherein the percentage is assigned such that a new section of the multi-sectioned battery is assigned a weighted figure of 1 and subsequent weighted figures are assigned as a fraction or percentage of 1.

6. The method of claim 1, wherein the step of using the relationship and the current states of charges of the first and second sections to redistribute energy comprises:
   establishing an equilibrium point at which the states of charge of the first and second sections are at least approximately equal; and
   applying a section balancing algorithm for balancing the states of charge of the first and second sections around the equilibrium point such that the states of charge of the first and second sections vary in a first direction at states of charge greater than at the equilibrium point and vary in a second direction opposite from the first direction at states of charge less than at the equilibrium point.

7. The method of claim 6, wherein the equilibrium point is at a state of charge between about 40% and about 60%.

8. The method of claim 7, wherein the equilibrium point is at a state of charge of about 50%.

9. The method of claim 6, wherein the battery comprises a vehicle battery.

10. The method of claim 9, wherein the battery comprises a rechargeable electricity storage system.

11. The method of claim 9, wherein the section balancing algorithm is applied automatically at vehicle key-on.

12. The method of claim 6, wherein the step of using the relationship and the current states of charges of the first and second sections to redistribute energy further comprises applying timers to the first and second sections.

13. The method of claim 1, wherein the step of determining a relationship between a difference between the state of health of the first section and the state of health of the second section and a difference between a state of charge of the first section and a state of charge of the second section after a first time period comprises estimating the relationship between a difference between the state of health of the first section and the state of health of the second section and a difference between a state of charge of the first section and a state of charge of the second section after the first time period.

14. A vehicle system for balancing battery states of charge in a multi-sectioned battery of the vehicle, comprising:
   a vehicle battery system comprising a plurality of battery sections; and
   a battery balancing system coupled to the plurality of battery sections and configured to redistribute energy between the plurality of battery sections,
      wherein the balancing system is configured to assess states of health of at least a subset of the plurality of battery sections and current states of charge of at least a subset of the plurality of battery sections,
      wherein the balancing system is configured to use the states of health and the current states of charge to apply a balancing algorithm, and
      wherein the balancing algorithm is configured to establish an equilibrium point at which the states of charge of the at least a subset of the plurality of battery sections are at least approximately equal and to balance the states of charge of the at least a subset of the plurality of battery sections around the equilibrium point such that the states of charge of the at least a subset of the plurality of battery sections vary during vehicle operation around the equilibrium point according to their respective states of health.

15. The system of claim 14, wherein the battery balancing system is configured to determine a relationship between a difference between states of health of the at least a subset of the plurality of battery sections and a difference between states of charge of the at least a subset of the plurality of battery sections during operation of the vehicle.

16. The system of claim 15, wherein determining a relationship between a difference between states of health of the at least a subset of the plurality of battery sections and a difference between states of charge of the at least a subset of the plurality of battery sections during operation of the vehicle comprises estimating a relationship between a difference between states of health of the at least a subset of the plurality of battery sections and a difference between states of charge of the at least a subset of the plurality of battery sections during operation of the vehicle.

17. The system of claim 14, wherein the balancing algorithm is configured to balance the states of charge of the at least a subset of the plurality of battery sections around the equilibrium point such that a spread between the states of charge of the at least a subset of the plurality of battery sections increases as the respective states of charge of the at least a subset of the plurality of battery sections increase above the equilibrium point.

18. The system of claim 14, wherein the battery balancing system comprises battery control electronics communicatively coupled to the vehicle battery system, wherein the battery control electronics is configured to implement the balancing algorithm.

19. The system of claim 14, wherein the battery balancing system comprises a plurality of sensors for obtaining data used to at least one of determine states of charge for the at least a subset of the plurality of battery sections and determine states of health for the at least a subset of the plurality of battery sections.

20. A vehicle, comprising:
   a vehicle battery system comprising a plurality of battery sections;
   a plurality of sensors coupled to the plurality of battery sections, wherein the sensors are configured to obtain data used to determine states of health and states of charge of the plurality of battery sections; and
   a battery balancing system coupled to the plurality of battery sections and configured to redistribute energy between the plurality of battery sections,
      wherein the balancing system is configured to receive data from the sensors regarding states of health of the plurality of battery sections and states of charge of the plurality of battery sections and apply a balancing algorithm to the plurality of battery sections to redistribute energy between the plurality of battery sections according to the balancing algorithm, and
      wherein the balancing algorithm is configured to establish an equilibrium point at which the states of charge of the plurality of battery sections are at least approximately equal and to balance the states of charge of the plurality of battery sections around the equilibrium point such that the states of charge of the plurality of battery sections vary during vehicle operation around the equilibrium point according to their respective states of health.

* * * * *